July 4, 1967  C. L. DAVID  3,329,186
SAW BLADE ATTACHING MEANS

Filed Oct. 23, 1965  2 Sheets-Sheet 1

INVENTOR.
CLAUDE L. DAVID
BY
Hugh A Kirk
ATTORNEY

July 4, 1967

C. L. DAVID 3,329,186

SAW BLADE ATTACHING MEANS

Filed Oct. 23, 1965

INVENTOR.
CLAUDE L. DAVID

BY

*Hugh A. Kirk*

ATTORNEY

United States Patent Office 3,329,186
Patented July 4, 1967

3,329,186
SAW BLADE ATTACHING MEANS
Claude L. David, 703 Broadway, Leipsic, Ohio 45856
Filed Oct. 23, 1965, Ser. No. 503,495
18 Claims. (Cl. 145—33)

This invention relates to saws and is particularly directed to a saw frame and saw blade attaching means.

An object of the present invention is to provide the shanks or blade receiving legs of a saw frame or handle with slots or notches for the reception of pin and bolt means for attaching the blade, together with means to locate the blade at various angles with respect to the frame.

Another object of the invention is to provide coupling means between the opposite ends of a saw blade and the blade attaching portions of the saw frame which permit of quick attachment and release between the blade and frame by assembling the attaching means and blade and moving the assembly laterally into and out of attachment with the blade receiving portions of the frame.

Generally speaking, the invention contemplates a new and improved attaching means between a saw handle and a saw blade in which the shanks or legs of saw frame are each provided with a hub or shoulder means and a notch capable of receiving saw blade attaching means. This blade attaching means includes a bolt and pin means at opposite ends of the saw blade, each of which means is adapted to be seated at any one of a plurality of preselected angular positions in the notches in the handle legs. Thus the blade and its attaching means may be attached and removed from the saw handle as a unit. This blade attaching means also includes flange means cooperating with said hub or shoulder means to hold the blade and attaching means in said notches when the blade is tightened or stretched between the leg members.

The above mentioned and other features and objects of this invention and the manner of attaining them will become more apparent and the invention itself will be understood best by reference to the following description of embodiments of the invention taken in conjunction with the accompanying drawings, wherein.

Figure 1:
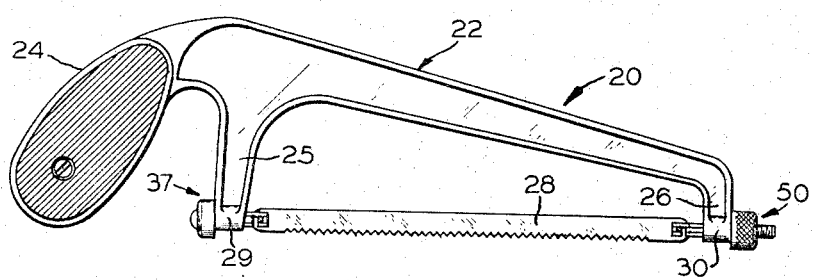
FIG. 1 is a side view of a saw frame and blade connecting means incorporating the invention.
Figure 5:
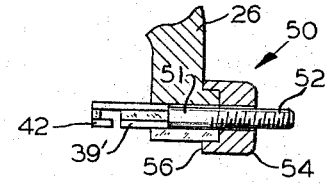
FIG. 5 is a view similar to FIG. 3 of the right hub and coupling means of FIG. 1.
Figure 6:
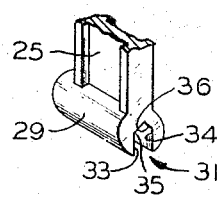
FIG. 6 is a fragmentary perspective view of a grooved hub.

Referring to the drawing and particularly FIG. 1, a saw assembly indicated generally at 20 has been illustrated as including a frame 22, such as a bow frame having a handle portion 24 and spaced shank or leg members 25 and 26 between which a blade 28 is stretched. The outer or lower ends of leg members 25 and 26 are enlarged to provide bosses or hub portions 29 and 30 to accommodate longitudinal grooves, slots or notches 31 and 32. As particularly shown in FIGS. 5 and 6, the hubs 29 and 30 are of circular form, having end portions extending in opposite directions beyond legs 25 and 26, respectively. The grooves or notches 31 and 32 may have opposed substantially parallel walls or sides 33 and 34 connected at their inner ends by converging diagonal walls 35 and 36 which form an inverted V in the bottoms of the grooves 31 and 32.

Figure 3:
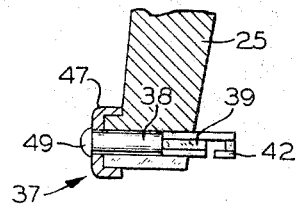
FIG. 3 is an enlarged fragmentary view of the left hub and coupling means of FIG. 1.
Figure 4:
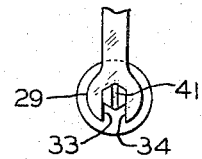
FIG. 4 is an end view of the coupling means of FIGS. 3 and 5 taken from between the legs of the saw frame.

Received in the groove 31 of hub 29 is a connector, coupling, or attaching means in the form of a pin 37 which may have a cylindrical portion 38 and a hexagonal or other multi-sided portion 39 the outer end of which may be provided with a slit 41 and a hook 42 at the terminal end thereof. The slit 41 may extend the length of the hexagonal portion 39 to receive the end of blade 28, which blade may have a cross pin 45 engageable with the hook 42. To the end of the cylindrical portion 38 is fixed a flanged or cupped washer 47 as by riveting the end of the portion 38 as at 49 in FIG. 3.

Another connector, coupling or attaching means 50, generally similar to pin means 37 may have a hexagonal portion 39′ and a hook 42 provided for groove 32 of hub 30. The cylindrical portion 51 thereof differs from pin 37 in that it is threaded as at 52 to receive a knurled nut 54 having a cap or cupped inner end 56. The nut 54 serves as means for tightening or stretching blade 28 between the legs 25 and 26 when the blade connector or attaching members 37 and 50 are positioned in grooves or notches 31 and 32. The flanged or cupped ends of washer 47 and nut 54 bear on the extended ends of hubs 29 and 30 to retain pin 37 and bolt 50 in position in their respective grooves 31 and 32 when nut 54 is tightened to stretch blade 28 between the legs 25 and 26.

Because grooves or notches 31 and 32 are downwardly open, the saw blade 28 and its releasable attaching means 37 and 50 may be positioned in and removed from the hub portions 29 and 30 as a unit by lateral movement with respect thereto, it being only necessary that nut 54 be sufficiently loose so that caps 47 and 56 may pass the hubs 29 and 30 to accomplish such movement.

Due to the shape of grooves or notches 31 and 32 in the embodiment of FIGS. 1 through 6, the four adjacent sides of the hexagonal pins 39 and 39′ at the opposite ends of the blade 28 may be positioned with the blade at various angles with respect to the legs 25 and 26, for example at 60° and 90° in either direction from the position shown in FIG. 1. In each position the blade 28 is fixed by reason of the hexagonal portions 39 and 39′ of the pin 37 and bolt 50, respectively, which not only properly locate the blade but prevent the turning thereof when the saw is in use.

Figure 2:
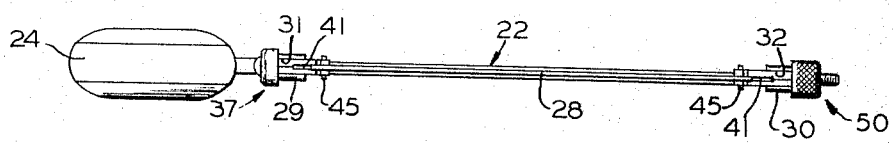
FIG. 2 is a bottom view of the saw shown in FIG. 1.
Figure 7:
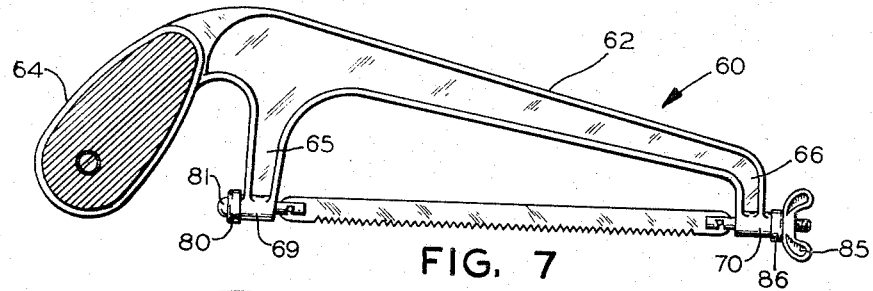
FIGS. 7 and 8 are views similar to FIG. 1, but showing a modified blade tightening nut at different ends of the blade.
Figure 8:
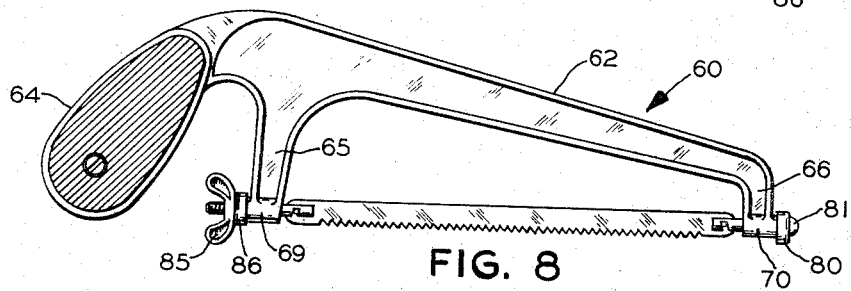

Referring now to the modified form of saw assembly 60 shown in FIGS. 7 and 8, the frame 62, having handle portion 64 and spaced leg members 65 and 66, is generally similar to saw assembly 20 of FIGS. 1 and 2. The connector means differ therefrom, as the hubs 69 and 70 may have grooves 71 and 72 of inverted U-shape as particularly shown in FIGS. 11 and 12, to accommodate cylindrical pin or bolt means 76 or 78, respectively. The hubs 69 and 70 may be of circular form having oppositely extending end portions 73 and 74, respectively, outwardly of legs 65 and 66.

Figure 9:
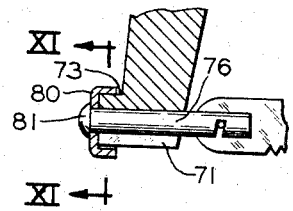
FIG. 9 is an enlarged fragmentary view of the left hub and coupling means of FIG. 7.
Figure 10:
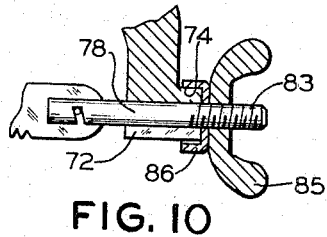
FIG. 10 is a view similar to FIG. 9 of the right hub and coupling means of FIG. 7.
Figure 11:
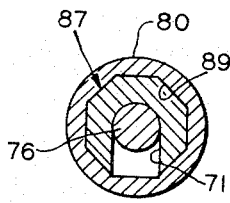
FIG. 11 is an enlarged sectional detail view taken on line XI—XI of FIG. 9 showing a polygonal configuration for the hub and flanged cap of the angularly adjustable coupling means.
Figure 12:
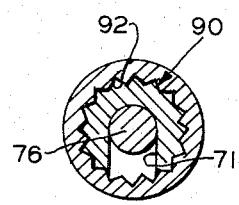
FIG. 12 is a view similar to FIG. 11 but showing a different hub and flanged cap configuration of the coupling means.

Pin means 76 receivable in either groove 71 or 72, is provided with a flanged or cupped washer 80 which may be attached to the pin 76 as by riveting the end of the pin 76 as at 81 in FIG. 9. Pin means 78 differs from pin 76 in that one end portion is threaded at 83 to receive a nut such as wing nut 85 adapted to engage a cupped or flanged washer 86 having a central aperture through which pin 78 passes. The end portions 73 and 74 of the hubs 69 and 70 may be of polygonal shape, as for example octagonal as shown at 87 in FIG. 11, and the inner faces of the flanged portions of washer 80 and 86 may be provided with a complementary configuration as at 89 also as shown in FIG. 11. Such arrangement provides additional positions of adjustment between the saw blade and the legs 65 and 66 of the saw frame. If a more minute adjustment is desired, the hub ends may be serrated as at 90 in FIG. 12 in which case the flanges of the washers 80 and 86 are provided with complementary serrations 92.

Figure 13:
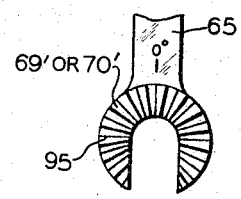
FIGS. 13 and 14 show still another embodiment of an attaching or coupling means, with serrations on the end of the hub and inside the flanged cap, respectively.
Figure 14:
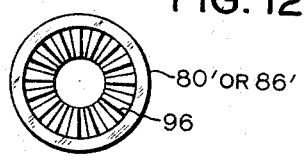

Alternately, the end faces of the hubs 69' or 70' in FIG. 13 may be provided with radial serrations 95, in which case the inner bottom face of washers 80' or 86' may be serrated at 96.

In all forms of the invention, the hub portions of the saw frame legs are formed with multi-sided surfaces circumferentially spaced substantially around the axis of alignment adjacent the bottoms of the slots or grooves and complementary multi-sided surfaces are provided on each of the blade attaching means so that the angular position of the blade may be adjusted with respect to the legs.

Furthermore positive locating means as well as simple, effective attaching means between a saw frame and blade has been provided which effectively reduces strain on the leg members when the saw is in use. In this connection it is to be noted that the cupped members 47 and 54 or 80 and 86 not only retain the blade laterally, they also prevent undue strain on the hub portions due to their bearing engagement circumferentially on the hub extensions.

While there is described above the principles of this invention in connection with specific apparatus, it is to be clearly understood that this description is made only by way of example and not as a limitation to the scope of this invention.

What is claimed is:
1. A saw having spaced legs to which a blade is adjustably secured comprising:
 (a) hub means at the ends of said legs,
 (b) coaxially aligned grooves in said hub means,
 (c) connector means seated in said grooves for securing said blade to said frame,
 (d) said connector means having portions non-rotatably coupled to said hub means for angular positioning of said blade means,
 (e) said connector means having hub engaging means and opposed saw blade attaching end portions projecting beyond said grooves, and
 (f) means threaded on one of said connector means to removably secure said blade and connector means to said frame.

2. A saw according to claim 1 wherein said hub engaging means include cap means for fitting over the outer ends of said hub means to retain said blade and connector means in said grooves when said blade is tensioned between said legs of said frame.

3. A saw according to claim 2 wherein said threaded means includes said cap means.

4. A saw comprising:
 (a) a saw blade having attaching means at its opposite ends,
 (b) a saw frame having spaced depending leg members,
 (c) aligned grooves in said leg members, said grooves having parallel side walls,
 (d) a connector seated in each of said grooves and having a polygonal portion cooperable with said parallel side walls for angular adjustment of said blade,
 (e) means on the outer ends of said connectors to retain said connectors in said grooves and means on the inner ends of said connectors to engage said blade attaching means, and
 (f) means adjustable on one of said connectors to stretch said blade between said leg members.

5. A saw according to claim 4 wherein said leg members have outwardly extending hub portions, and wherein each of said connectors includes a cap means for fitting over said hub portions to retain said blade in said grooves.

6. A saw having spaced depending leg members comprising:
 (a) hub means at the terminal ends of said leg members,
 (b) longitudinal grooves in said hub means having a parallel walls,
 (c) a connector in the groove in one of said hub means,
 (d) a threaded connector in the groove in the other of said hub means,
 (e) said connectors each having a polygonal portion cooperable with said parallel side walls for angular adjustment of said blade,
 (f) means adjustable on said threaded connector to stretch a saw blade between the leg members of said saw frame, and
 (g) said connectors including means for engaging the outer ends of hub means to retain said connectors in said grooves.

7. A saw comprising:
 (a) a blade,
 (b) attaching means on each end of said blade,
 (c) a frame extending beyond and between the ends of said blade,
 (d) a pair of aligned and slotted bosses on said frame beyond the ends of said blade, said slots in said bosses having parallel sides,
 (e) a pair of pins of polygonal cross-section slidable in said slots and cooperable with said parallel sides to angularly position said blade,
 (f) a pair of caps for the outer ends of said pins for releasably covering the outer ends of said bosses, at least one of said caps being longitudinally adjustable on its pin, and
 (g) a pair of means on the inner ends of said pins for releasable attachment to said attaching means on the ends of said blade.

8. In a reciprocating saw having a
 (a) saw blade with a fastening means near each end thereof,
 (b) a bow frame extending from one end of said blade to the other, and
 (c) means for releasably attaching said ends of said blade to said bow frame,
the improvement in said means comprising:
 (d) spaced bosses on said frame beyond the ends of said blade, said bosses having aligned grooves with parallel sides,
 (e) a first connector means having a cap which fits over the outer end of one of said bosses and has a pin portion with parallel sides cooperating with said parallel sides of the slot of said one boss and extending inwardly beyond said slot, and a means for attachment to one end of said blade, and
 (f) a second connector means having a threaded cap which fits over the outer end of the other of said bosses, and has a pin portion threaded at one end for said cap, said second connector means also having a means for attachment to the other end of said blade.

9. A saw comprising:
 (I) a frame including
  (A) a handle portion, and
  (B) a pair of spaced leg portions having (1) outwardly projecting hub portions,
(2) aligned outwardly open slots through said hub portions, and
(3) multi-sided surfaces circumferentially spaced substantially around the axis of alignment adjacent the bottom of said slots,
(II) a blade for detachable positioning between said leg portions, and
(III) a separate blade attaching means fastened to each end of said blade, and seatable in said slots, each said blade attaching means comprising:
(A) pin means positioned in one of said slots,
(B) cap means mounted on said pin means for fitting over said hub portion of the leg portion having that slot,
(C) multi-sided surfaces circumferentially spaced around the axis of said pin means for cooperating with said multi-sided surfaces on said associated hub portion for adjusting the angular position of said blade with respect to said leg portion, and
(D) nut means on at least one of said pin means for stretching said blade between said leg portions.

10. A saw according to claim 9 wherein said slots have a polygonal cross-section forming said multi-sided surfaces circumferentially of the axis of said pin means in said slots, and said pin means having hexagonal portions fitting therein, whereby said blade may be positioned in the plane of said leg portions as well as at 60° angles thereto.

11. A saw according to claim 9 wherein said multi-sided surfaces are on the outward end of said hub portion and on the inside of said cap means.

12. A saw according to claim 11 wherein said multi-sided surfaces comprise serrations.

13. A saw according to claim 9 wherein said multi-sided surfaces are on the circumference of said outwardly projecting hub portions, and on the inside of the flange portion of said cap means.

14. A saw according to claim 9 wherein one of said pin means is rigidly attached to one of said cap means.

15. A saw according to claim 9 wherein one of said cap means is held over said hub means by said nut means.

16. A saw according to claim 9 wherein each said pin means includes a hook means projecting inwardly toward the opposite leg portion for attachment of said blade.

17. A saw according to claim 9 wherein said nut means comprises a wing nut.

18. A saw according to claim 9 wherein said nut means comprises a knurled outer surface and is combined with said cap means.

References Cited

UNITED STATES PATENTS

| | | | |
|---|---|---|---|
| 343,254 | 6/1886 | Richardson | 145—33 |
| 1,203,537 | 10/1916 | Haase. | |

FOREIGN PATENTS

| | | |
|---|---|---|
| 125,245 | 8/1947 | Australia. |
| 148,471 | 10/1952 | Australia. |
| 50,717 | 10/1911 | Austria. |
| 60,387 | 4/1954 | France. |

WILLIAM FELDMAN, *Primary Examiner.*

R. V. PARKER, JR., *Assistant Examiner.*